United States Patent [19]

Lustenberger et al.

[11] Patent Number: 5,601,346
[45] Date of Patent: Feb. 11, 1997

[54] ANTI-SKIDDING PROCESS AND DEVICE FOR VEHICLES

[75] Inventors: Martin P. Lustenberger, Villars-sur-Glane; Heinrich K. Feichtinger, Hinteregg, both of Switzerland

[73] Assignee: Digi Sens AG Digitale Messtechnik, Meyriez, Switzerland

[21] Appl. No.: 616,044

[22] Filed: Mar. 25, 1996

Related U.S. Application Data

[63] Continuation of Ser. No. 307,830, Sep. 28, 1994, abandoned.

[30] Foreign Application Priority Data

Feb. 5, 1993 [CH] Switzerland .............. 350/93
Jan. 26, 1994 [WO] WIPO .......... PCT/CH94/00016

[51] Int. Cl.$^6$ .............. B62D 37/00; B60T 8/00; B60T 8/32
[52] U.S. Cl. .............. 303/146; 303/141; 303/177; 303/182; 303/191
[58] Field of Search .............. 303/111, 113.1, 303/177, 179, 181, 182, 185, 191, 141, 146

[56] References Cited

U.S. PATENT DOCUMENTS

| 3,909,044 | 9/1975 | Henzel et al. | 280/432 |
|---|---|---|---|
| 4,200,168 | 3/1980 | Moog | 180/282 |
| 4,282,948 | 8/1981 | Jerome | 74/572 |
| 4,687,225 | 8/1987 | Newton | 280/758 |
| 5,392,214 | 2/1995 | Momose et al. | 180/79.1 |

FOREIGN PATENT DOCUMENTS

| 0098657 | 1/1984 | European Pat. Off. . |
|---|---|---|
| 2606110 | 5/1988 | France . |
| C825643 | 11/1951 | Germany . |
| 280792A1 | 8/1979 | Germany . |
| 3731756 | 3/1989 | Germany . |
| 3919347 | 2/1990 | Germany . |
| 4208404 | 9/1992 | Germany . |
| 2351841 | 4/1995 | Germany . |
| 9104891 | 4/1991 | WIPO . |

*Primary Examiner*—Matthew C. Graham
*Attorney, Agent, or Firm*—Jenkens & Gilchrist, a Professional Corporation

[57] ABSTRACT

The present invention relates to a process and a device for the prevention of skidding in vehicles with at least two wheels (1-4) of which at least one (1, 4) is steerable, wherein the actual rotary acceleration of the vehicle along its vertical axis is measured by a rotary accelerometer (8) and compared with the nominal rotary acceleration which is determined by a computer (9) from the turn angle of the steerable wheels (1, 4) and the vehicle speed. The turn angle is measured by an angle measuring device (6), for example, at a steering wheel (5). The speed is measured with a speed pick-up (7) on at least one of the wheels (1-4) of the vehicle. The calculated difference between nominal and actual rotary acceleration is reduced to zero by the real-time generation of a compensation-torque in a device (10). This device (10) might consist of an electric motor (11) driving two contra-rotating flywheels (12) that are selectively decelerated and will stop the skidding process.

20 Claims, 1 Drawing Sheet

ANTI-SKIDDING PROCESS AND DEVICE FOR VEHICLES

This is a continuation of application Ser. No. 08/307,830, filed Sep. 28, 1994 now abandoned.

BACKGROUND OF THE INVENTION

The present invention relates to a process and a device preventing the skidding of vehicles on the road. In this case, the term "vehicle" can be a means of transportation driven by an engine, such as an automobile, as well as a non-driven vehicle, such as a towed trailer. The skidding motion referred to in the present case is neither a lateral drift perpendicular to the direction of travel, nor a push with blocked tires in the direction of travel, but an involuntary rotary motion around the vertical axis of the vehicle that is not determined by the position of the tires.

This skidding motion can be caused by one of the following:

It can be the result of an intended change of direction in which the vehicle is travelling. This requires the transmission of lateral forces by the tires onto the vehicle. If it exceeds the adhesive limit of the tires, the vehicle will ideally drift in a lateral direction. In most cases, the adhesive limit will not be exceeded at both axes simultaneously. This will lead to a rotary motion and, thus, skidding of the vehicle.

A further cause for skidding are suddenly occurring lateral forces, such as the ones caused by gusty winds.

Another cause for skidding are the more or less frequent vibrations of the vehicle itself that, in turn, are initiated by occasional irregularities in the road surface.

Moreover, skidding can be caused by asymmetrical drive and brake actions especially in case of reduced limiting friction.

The skidding process has a positive reaction characteristic, i.e. a small initial disturbance will result in a change in direction, which will, in turn, trigger a larger disturbance that can, ultimately, result in a continuous series of vibration. This will cause the driver, especially one lacking experience, to lose control over the vehicle. It is, therefore, advantageous to eliminate any disturbance in its initial stage.

There are numerous devices that have been recommended for the prevention of skidding. One of them is the Anti-Blocking-System (ABS) that is successfully used in vehicular technology. In the ABS, the rotary speed of the individual wheel is compared to the vehicle speed with a difference in both speeds indicating the loss of contact with the road. An automatic system will then change the drive and brake effect at this wheel and, thus, restore the lost contact with the road. The ABS is a passive system in that it cannot neutralize the disturbing forces by means of compensative counter-forces.

Other devices attempt to actively compensate for any disturbing forces suddenly impacting the vehicle. The simplest form of such a compensation is an easily moveable mass that is linked to the vehicle mass by means of springs in the preferred direction in which a disturbance will take effect. The spring characteristic is chosen in such a way that it will preferably compensate for vibrations within a certain frequency range. In U.S. Pat. No. 4,687,225, such a moveable mass is used between two springs in a housing that is partially filled with liquid and it is recommended to install this housing close to the rear axle. A similar recommendation for the prevention of self-induced vibrations in trailers is also mentioned in DE Pat. No. 28 07 972 A1.

In another recommendation according to EP Pat. No. 0'098'657, such a spring-loaded mass can also be replaced by a flywheel. Due to the kinetic energy of the flywheel, the stabilizing counter-forces can be generated by a smaller mass.

Other systems that have been recommended include some that determine the disturbing forces with the help of an accelerometer with regard to strength and direction and use a power-assisted control system to generate a counter-force determined by the measured direction and strength. U.S. Pat No. 3,909,044 proposes a system in which a rotary system is used for the detection of lateral forces impacting a trailer. In this instance, the counter-force is generated by the towing vehicle by using a brake assembly to reduce the usually swiveling connection between towing vehicle and trailer in its movability as a function of the strength of the disturbing force.

U.S. Pat. No. 4,200,168 describes a system for the stabilization of swinging motions in a vehicle in which a detection system, in form of a physical pendulum, determines the strength and direction of a disturbance and, by means of a hydraulic relay, converts it into a pressure flow that, in turn, causes a corresponding motion in a flywheel by means of a hydraulic engine. The acceleration of this flywheel generates a torque directed against the disturbance. This device is particularly recommended for one-track vehicles and the acceleration process can also be used to move a mass that will improve the mass-center position of the inclined vehicle.

FR Pat. No. 2,606,110 describes a more elaborate system using four flywheels in one common plane of which two are arranged symmetrically right and left on a plane perpendicular to this plane and rotate in the opposite direction, while the disturbing forces take effect along this vertical plane. Frequency, amplitude, and phase of a vibrating disturbance are analyzed by an accelerometer and subsequently converted into an electric signal by means of a computer. This signal will then be compared to signals corresponding with the speed and position of the electric motors driving the flywheels. The difference results in a control signal supplying each motor with the corresponding voltage so that the combined effort of the four flywheels compensates for the disturbing torque.

The skidding reaction of vehicles has already been dramatically improved by the use of the ABS technology, especially in case of extreme changes in speed on roads with reduced limiting friction as is the case when a braking action is performed on a wet or icy road. Even the propagation of a continuous skidding-vibration reaction is reduced. The ABS system is, however, a passive system in that it cannot generate any active counter-forces in case of disturbing forces, but only optimize the limiting friction of the vehicle with regard to the road. Such passive systems are of only limited use, particularly in case of suddenly occurring disturbances, since they fail to compensate these occurring disturbing forces.

The disadvantage of the active systems mentioned above is the fact that the additional mass needed for the generation of sufficient counter-forces increases the total weight of the vehicle in an undesirable manner (U.S. Pat. No. 4,687,225, DE 28'07'972 A1, EP 0'098'657) and allows only for the compensation of periodic disturbances within a very limited frequency range for which these damping systems have received optimum adjustment. Most of these proposals are, therefore, dealing to the prevention of skidding in trailers (U.S. Pat. No. 3,909,044) or one-track vehicles (U.S. Pat. No. 4,200,168).

The disadvantage of the system described in FR 2'606'110 is the fact that not all data relevant to determining the rotary condition of the vehicle are measured and, thus, only vibrating disturbances are analyzed and compensated for by means of the flywheels.

The present invention is directed to providing a device and a process that prevents the skidding of vehicles, allows for the active compensation of all disturbing forces occurring at the vehicle with integration of all data relevant for determining the rotary condition of the vehicle (especially if these disturbances are of sudden nature), without increasing the weight of the vehicle to any noticeable extent.

The solution to this problem is presented in the introductory part of patent claim 1 regarding the process and in the introductory part of patent claim 11 regarding the device.

An analysis of the skidding process illustrates the fact that the skidding is caused by a disturbing torque impacting the vehicle which, in turn, causes the current wheel position to deviate from the direction of travel. This is evidenced by the fact that the actual rotary acceleration of the vehicle along its vertical axis does not correspond with the rotary acceleration that should be the result of the turn angle of the wheels, the vehicle speed as well as the change per unit time of these values. An estimated calculation shows that the torques required for the compensation of disturbances are rather small even in a big car and that relatively small torques in the opposite direction suffice in the prevention of the skidding process. This is a classical stability problem: due to the positive feedback quality of the process, it is advantageous to eliminate the disturbance in its early stage.

The process or the device of this present invention does not only measure the actual rotary acceleration of any vehicle along its vertical axis, but also includes the vehicle speed and the position of the steering wheel. The measurements of the last two values serve for the computation of the nominal rotary acceleration with a computer. The difference between nominal and actual rotary acceleration is converted into a control signal. This signal is used to decelerate two flywheels rotating in the horizontal plane of the vehicle in a contra-rotating manner at high speed in such a way that the torque resulting from this deceleration process compensates for most of the disturbing torque which will prevent the skidding process at a relatively early point in time.

DETAILED DESCRIPTION OF THE FIGURES

Figure 1:
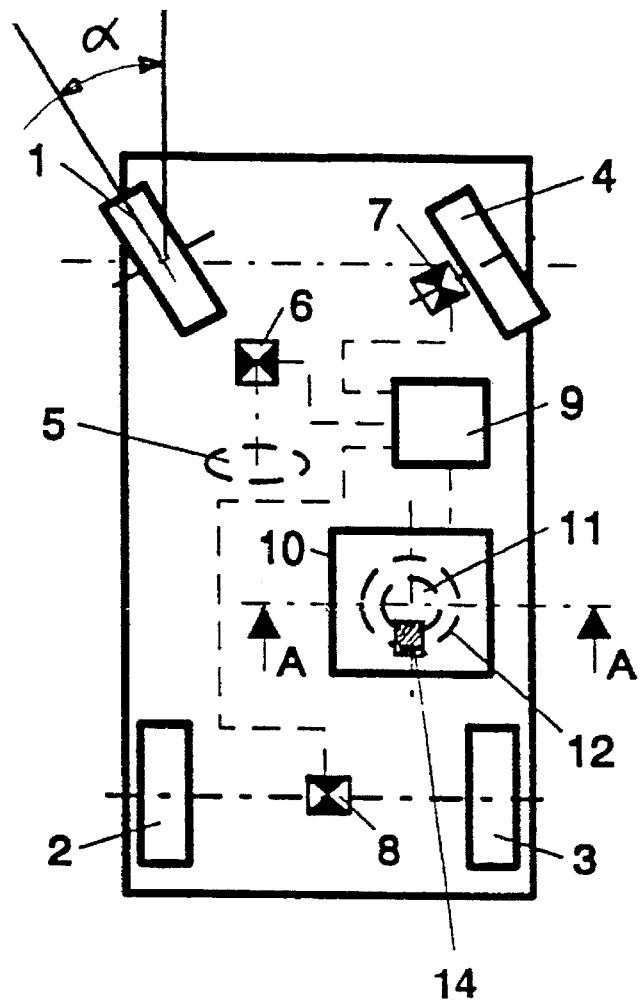
FIG. 1 is a plan view of a vehicle.

FIG. 1 represents the plan view of a vehicle, numbers 1 to 4 illustrate the four wheels of the vehicle with none or any number of wheels being driven. In the example, only wheels 1 and 4 are steerable and represent the front wheels of a vehicle. These exhibit a steering turn against the longitudinal axis of the vehicle which is determined by angle $\alpha$. This angle $\alpha$ or a value proportional to it is measured with an angle measuring device 6. Instead of directly measuring the angle $\alpha$, one can also measure the rotary angle $\phi$ of a steering wheel 5 that is part of a vehicle anyway and mainly proportional to the angle $\alpha$. This can be done by a rotary speed pick-up located at the axle of the steering wheel 5 and whose measurements are integrated over time. A speed pick-up 7 is preferably used to measure the speed of a non-driven wheel 4 with the speed being proportional to the vehicle speed. A rotary accelerometer 8 is preferably installed close to the center between the two wheels 2 and 3, since the pivot of the motion occurring in case of a direction change in a vehicle is usually located in the center of the rear axle that is not steered. The rotary accelerometer 8 can also consist of two lateral accelerometers with one installed in the front and one in the rear of the vehicle. The rotary accelerometer 8 measures the actual rotary acceleration of the vehicle. A real-time computer 9 calculates the nominal rotary acceleration and the difference between the nominal and actual rotary acceleration, proportional to the disturbing torque, based on the measurements of the angle measuring device 6, the speed pick-up 7, and the rotary accelerometer 8. A control signal corresponding to this difference is directed from the computer 9 to a device 10 that will generate a compensation torque.

Figure 2:
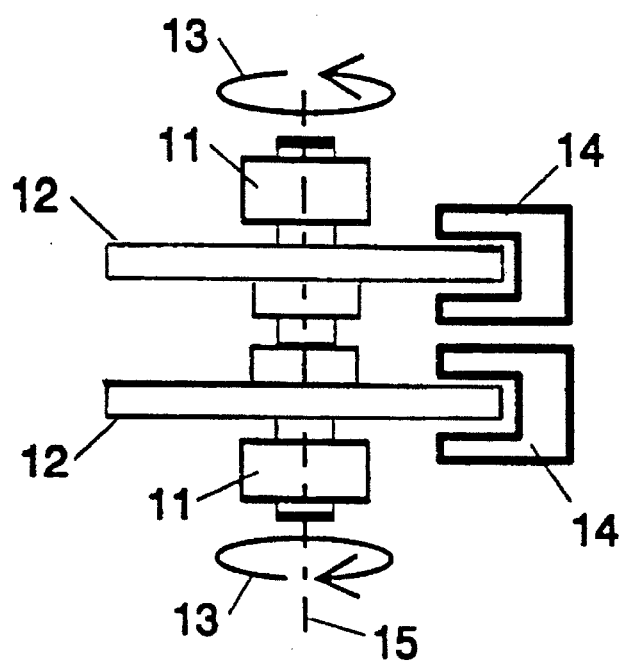
FIG. 2 is a device for the generation of the compensating torque.

FIG. 2 represents a possible realization of device 10 for the generation of a compensation torque in a vertical cutaway view. The device has two flywheels 12 whose rotary axes 15 are perpendicular to the movement plane of the vehicle. The flywheels 12 are maintained by two motors, preferably electric motors, in a contra-rotating manner 13 at a high-speed state. Each of the two flywheels 12 can be selectively decelerated by one brake assembly 14 each. The motors 11 can be used for this deceleration process. Additional possibilities are the use of eddy-current brakes or conventional mechanical brakes. The energy needed for the braking process can be totally or partially taken from the already existing wheel-brake support system. Depending on the flywheel 12 that is to be decelerated and the strength of the deceleration, a torque will be generated determined by strength and sign. This will lead to a complete compensation of the disturbing torque and the skidding process will come to an end.

The process described above and the corresponding device can be used for one-track vehicles in an analogous fashion: this can be done by eliminating wheels 1 and 4 and installing the actual rotary accelerometer close to wheel axis 3.

The compensation torque required to end the skidding process can be easily calculated in the following manner:

The speed of the vehicle $v_F$ is the result of the measurements from the speed pick-up 7 and the known diameter of the wheel 4. The turn angle $\alpha$ which is almost the same at both wheels 1 and 4, is measured with the angle measuring device 6 and, thus, also known. The nominal angular speed $\omega_s$ of the vehicle around its vertical axis is the result of the turn angle $\alpha$ of the wheels, the vehicle speed $v_F$, and the wheel position $L_F$ of the vehicle:

$$\omega_s = \frac{v_F \sin(\alpha)}{L_F} \quad \text{(EQUATION 1)}$$

The actual rotary acceleration $$\frac{d\omega_t}{dt},$$

i.e. the temporal change of the actual angular speed $\omega_t$, is directly measured by the rotary accelerometer 8. If $I_F$ is the rotary inertia of the vehicle, $I_o$ that of a flywheel 12 and $\omega_o$ the angular speed of one of the two flywheels 12, the angular momentum conservation law results in the following equation:

$$\left(\frac{d\omega_t}{dt} - \frac{d\omega_s}{dt}\right) \cdot I_F = \frac{d\omega_o}{dt} \cdot I_o \quad \text{(EQUATION 2)}$$

The computation of the nominal rotary acceleration $$\frac{d\omega_s}{dt}$$

is done by the computer 9 in that it calculates an approximate value according to equation 3 based on the measured values of the speed pick-ups 6 and 7:

$$\frac{d\omega_s}{dt} = \frac{1}{L_F} \cdot \left[\frac{dv_F}{dt} \sin(\alpha) + V_F \cdot \cos(\alpha) \cdot \frac{d\alpha}{dt}\right] \quad \text{(EQUATION 3)}$$

The following example is merely a further explanation:

A mid-size car has a weight of approximately 1,000 kg, a wheelbase of 2.6 m and a rotary inertia around the vertical axis of $I_F=1,000$ kg m². The diameter of the flywheels is 30 cm and their inertia assumed to be 0.5 kg m². The maximum speed is assumed to be 60,000 RPM.

Based on these assumptions, it is possible to generate a corrective torque of 3000 Nm within one second that will reduce the rotary velocity of the vehicle from 0.5 RPS to zero.

In order to rotate a standing vehicle and overcome the limiting friction of all four wheels, a flywheel will have to be decelerated to zero within 0.2 seconds. In reality, only a fraction of this existing momentum is needed to maintain the stability of a vehicle that has begun to skid.

By mechanically or electronically limiting the braking forces applied to the flywheels, it can be ensured that the vehicle will remain under control in case of normal driving conditions even if a faulty engagement of the Anti-Skidding-System should occur.

The size of the flywheels 12 and their speed already limits the maximum possible effect on the rotary state of the vehicle. A limitation of the braking forces can easily be accomplished with mechanical stops, pressure-limiting elements in the hydraulic system or even a system resembling ABS. This can also be accomplished by installing a separate electronic safety circuit that will prevent the engagement of the Anti-Skidding-System in case the computer receives faulty data.

What is claimed is:

1. A process for the prevention of skidding of vehicles with at least two wheels of which at least one is steerable, wherein said process comprises the steps of:

measuring an actual rotary acceleration of the vehicle around a vertical axis of the vehicle with a rotary accelerometer (8);

measuring a rotary speed of at least one of the wheels (1-4) of the vehicle with a speed pick-up (7);

measuring a change in a turn angle of the at least one steerable wheel (1, 4) with an angle measuring device (6);

calculating with a real-time computer (9) a nominal rotary acceleration of the vehicle along the vertical axis of the vehicle based on the measurement of the rotary speed from the angle measuring device (6) and the measurement of the change in the turn angle from the speed pick-up (7), comparing the nominal rotary acceleration with the actual rotary acceleration from the measurements of the rotary accelerometer (8) and calculating the difference between the nominal rotary acceleration and the actual rotary acceleration; and selectively decelerating one of two flywheels (12), rotating in the travel plane of the vehicle and in a contra-rotating direction, based on the difference between the nominal rotary acceleration and the actual rotary acceleration, by applying a braking force to the one of said two flywheels with a brake assembly (14) in such a way that a counter-torque is generated with a strength and direction which will reduce the difference between the nominal rotary acceleration and the actual rotary acceleration, thereby reducing the skidding process of the vehicle.

2. The process of claim 1, wherein said angle measuring device (6) is an additional speed pick-up measuring the rotary speed of a steering wheel (5) connected to the steerable wheel (1, 4) in such a way that its rotary angle is substantially proportional to the turn angle ($\alpha$).

3. The process of claim 1, wherein said flywheels (12) are driven by an electric motor (11).

4. The process of claim 1, wherein energy needed for the generation of the braking force applied by the brake assembly (14) to one of the two flywheels (12) is provided by a wheel-brake support system of the vehicle.

5. The process of claim 1, wherein the brake assembly (14) uses eddy-current braking to apply the braking force to the desired one of the two flywheels.

6. The process of claim 1, wherein the actual acceleration along the vertical axis of the vehicle is calculated based on the measurements of two lateral accelerometers located at different positions.

7. The process of claim 1, wherein the speed pick-up (7) generates a signal that is proportional to the rotary speed of at least one of the vehicle wheels (1-4).

8. The process of claim 2, wherein the speed pick-up in the angle measuring device (6) generates a signal that is proportional to the rotary speed of a steering wheel (5).

9. The process of claim 1, wherein the generated counter-torque is such that the vehicle remains under control under normal driving conditions and when a faulty engagement of the Anti-Skidding-System occurs.

10. The process of claim 9, wherein a separate control circuit prevents the generation of a faulty counter-torque when the real-time computer receives a faulty measurement from at least one of the group consisting of angle measuring device, the speed pick-up, and the rotary accelerometer.

11. A device for the prevention of skidding in vehicles with at least two wheels of which at least one of said wheels is steerable, comprising a rotary accelerometer (8) for measuring a rotary acceleration along a vertical axis of the vehicle;

a speed pick-up (7) on at least one of the wheels (1 - 4) of the vehicle;

an angle measuring device (6) for measuring a turn angle of the at least one steerable wheel (1, 4);

a computer (9) linked to the rotary accelerometer (8), the speed pick-up (7) and the angle measuring device (6) by data lines;

two flywheels (12) rotating in the traveling direction of the vehicle with a contra-rotary motion (13); and wherein each flywheel (12) is equipped with a controlled brake assembly (14) connected to the computer by control wires.

12. The device of claim 11, wherein the angle measuring device (6) is a speed pick-up for measuring the angular rotary speed of a steering wheel (5) having rotary angle substantially proportional to the turn angle of the steerable wheel (1, 4).

13. The device of claim 11, wherein both rotary axes (15) of the flywheels (12) are on the same line.

14. The device of claim 11, wherein both rotary axes (15) of the flywheels (12) are on parallel lines.

15. The device of claim 11, wherein an electric motor (11) is present whose axis is linked to one of the flywheels (12).

16. The device of claim 11, wherein the brake assemblies (14) which control the flywheels (12), are connected to a wheel-brake support system of the vehicle.

17. The device of claim 11, wherein the brake assembly (14) of the flywheels is an eddy-current brake.

18. The device of claim 11, wherein the rotary accelerometer (8) consists of two lateral accelerometers linked with the computer (9).

19. The device of claim 11, further including a limiting assembly for limiting the braking forces exerted onto the flywheels (12).

20. The device of claim 11, further including a separate control circuit connected to the brake assembly (14) of the flywheels (12) by lines.

* * * * *

UNITED STATES PATENT AND TRADEMARK OFFICE
CERTIFICATE OF CORRECTION

PATENT NO. : 5,601,346
DATED : Feb. 11, 1997
INVENTOR(S) : Lustenberger et al.

It is certified that error appears in the above-indentified patent and that said Letters Patent is hereby corrected as shown below:

Title Page, Item [54]
Title
Replace "ANTI-SKIDDING PROCESS AND DEVICE FOR VEHICLES"
With --ANTI-SKIDDING PROCESS AND DEVICE USING COUNTER-ROTATING FLYWHEELS TO CANCEL OUT A SKID OF A TURNING VEHICLE--

Column 4, line 59
Replace "$d\omega_t$"
With --$d\omega_i$--

Column 5, line 1
Replace "$d\omega_t$"
With --$d\omega_i$--

Signed and Sealed this

Second Day of December, 1997

Attest:

BRUCE LEHMAN

Attesting Officer

Commissioner of Patents and Trademarks